Patented Oct. 10, 1922.

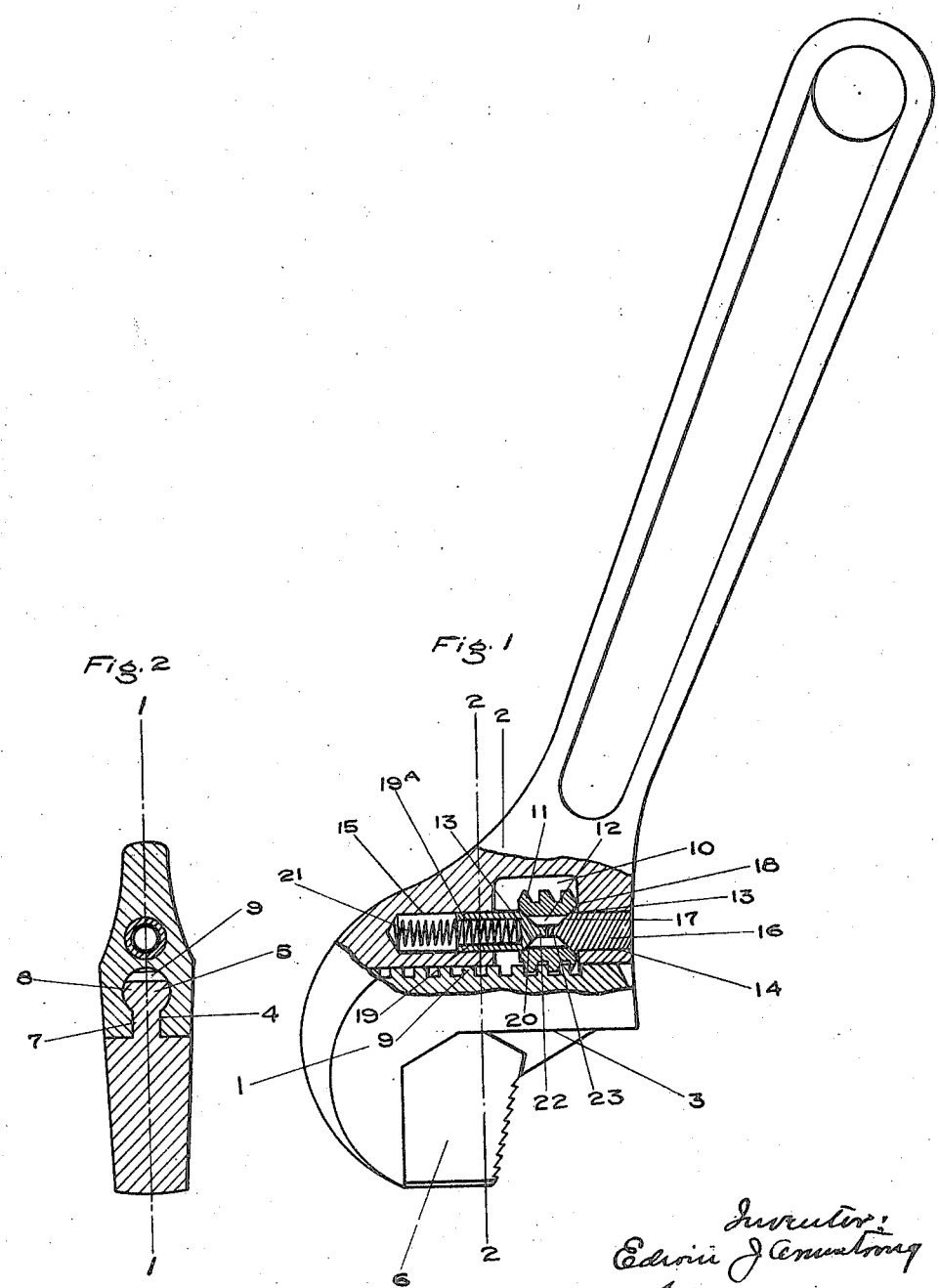

1,431,451

UNITED STATES PATENT OFFICE.

EDWIN J. ARMSTRONG, OF ERIE, PENNSYLVANIA, ASSIGNOR TO FREDERICK B. McBRIER, OF ERIE, PENNSYLVANIA.

WRENCH.

Application filed May 14, 1920. Serial No. 381,336.

*To all whom it may concern:*

Be it known that I, EDWIN J. ARMSTRONG, a citizen of the United States, residing at Erie, in the county of Erie and State of Pennsylvania, have invented new and useful Improvements in Wrenches, of which the following is a specification.

It is desirable in wrenches to have means provided whereby the movable jaw may be quickly moved from one adjustment to another and at the same time to have an adjustment which permits of the exact positioning of the movable jaw and a secure locking of the movable jaw. This is particularly desirable where the complete removal of the movable jaw is of advantage. The desirable features above enumerated are obtained in this invention. Other features will appear from the specification and claims.

The invention is illustrated in the accompanying drawings as follows:—

Fig. 1 shows a side elevation of the wrench partly in section on the line 1—1 in Fig. 2.

Fig. 2 is a section on the line 2—2 in Fig. 1.

1 marks the fixed jaw, 2 the shank extending from the fixed jaw, 3 a guide-way on the fixed jaw, 4 a guide-slot extending from the guide-way, and 5 an enlarged bore in continuation of the slot 4.

6 is a movable jaw slidingly mounted on the guide-way 3 and having a tongue 7 extending into the groove 4 with an enlarged edge 8 fitting into the bore 5. The edge of the tongue 7 is provided with a rack 9.

The shank is provided with a screw opening 10 which extends into the bore 5. An adjusting screw 11 is arranged in this opening and operates on the rack 9. The screw has an opening 12 extending axially through it terminating in the conical surfaces 13 at the ends.

A bore 14 extends into the shank parallel with the bore 5, this bore extending through the walls of the shank at one side of the opening 10 and having an extension 15 from the opposite side of the opening 10.

A pin 16 is slipped into the opening 14. It is provided with a tapered surface 17 acting on the surface 13 of the screw and is provided with a shoulder 18 which rests against the wall at the side of the opening 10. The pin is of such length that it can be readily inserted into the opening 10 and then into the opening 14 in assembling the wrench.

A movable or yielding pin 19 is arranged in the extension 15. It is provided with a tapered end surface 20 operating on the surface 13 of the screw and tending to center the screw axially with the pins 19 and 16. The pin 19 preferably has an opening 19$^a$ and a spring 21 is arranged in this opening and rests against the end of the bore 14 in the shank. It yieldingly forces the pin 19 forward into engagement with the screw.

It will readily be seen that the tapered surfaces on the pins acting in conjunction with the tapered surfaces in the screw tend to center and hold the screw in axial alinement with the pins and in engagement with the rack 9. Pressure is exerted on the screw away from the rack and the camming action of this pressure on the tapered surface 17 tends to crowd the screw to the left as shown in Fig. 1 carrying with it the pin 19. Further the camming action of the screw on the tapered surface 20 of the pin 19 tends to move the pin still farther to the left and consequently permits of a lateral movement of the screw to disengage it from the rack. This movement may be eased somewhat if desired by moving the screw axially toward the left with pressure away from the rack.

In order to prevent the accidental displacement of the screw the pin 19 is provided with a small extension 22 at its end and the pin 16 with a similar extension 23. This engages the walls of the opening 12 when the screw is thrust away from the rack and prevents the disengagement of the screw entirely from the pins.

The size of the opening 10 is such that the pin 19 may be forced back into its socket a sufficient distance to permit of the placing of the screw over the pin 16 and when in this position the pin 19 may be released locking the screw in place. The screw may be removed in the same manner. It will be noted that the tapered surface 17 on the screw 16 receives the end thrust of the movable jaw and this tapered surface backed by the shoulder 18 makes a very rigid and efficient bearing for the screw.

It will be noted that the slot in which the tongue of the movable jaw is arranged extends from the face of the shank so that the movable jaw may be slipped out of the guide when the screw is disengaged. The guide is desirable not only to adjust the movable jaw but to permit of its removal.

What I claim as new is:

1. In a wrench, the combination of a fixed jaw; a shank on the jaw having a guide for a movable jaw and a screw opening therein; a movable jaw mounted on the guide and having a rack extending into said opening; a screw in said opening operating on said rack; and a bearing for the screw having axially yielding centering surfaces, centering the screw by axial pressure and permitting a movement of the screw out of engagement with the rack by the yielding of said bearing.

2. In a wrench, the combination of a fixed jaw; a shank on the jaw having a guide for a movable jaw and a screw opening therein; a movable jaw mounted on the guide and having a rack extending into said opening; a screw in said opening operating on said rack; an axially yielding pin having a centering end engagement with the screw tending to hold the screw in engagement with the rack; and a spring acting on the pin.

3. In a wrench, the combination of a fixed jaw; a shank on the jaw having a guide for a movable jaw and a screw opening therein; a movable jaw mounted on the guide and having a rack extending into said opening; a screw in said opening operating on said rack; an axially yielding pin having a centering end engagement with the screw tending to hold the screw in engagement with the rack; a spring acting on the pin; and a bearing for the opposite end of the screw having a tapered engaging surface.

4. In a wrench, the combination of a fixed jaw; a shank on the jaw having a guide for a movable jaw, a screw opening therein and bearing pin openings in the shank extending in alinement from opposite sides of the screw opening; a screw in the opening having a tapered surface centering with the axis of the pin openings; a pin fixed in one opening and receiving the thrust of the screw; an axially yielding pin with a tapered surface in the opposite opening engaging the screw with its tapered surface and yieldingly holding the screw in place; and a spring in the opening back of said yielding pin.

5. In a wrench, the combination of a fixed jaw; a shank on the jaw having a guide for a movable jaw, a screw opening therein and bearing pin openings in the shank extending in alinement from opposite sides of the screw openings; a movable jaw operating on said guide; a screw arranged in the opening operating on the movable jaw, said screw having a tapered bearing surface; a pin fixed in one opening receiving the thrust of the screw; an axially yielding pin provided with a tapered surface in the opposite opening engaging the screw with a tapered surface and yieldingly holding the screw in place; and a spring in the opening back of said yielding pin, one of said pins having an extension of small diameter preventing the accidental removal of the screw.

6. In a wrench, the combination of a fixed jaw; a shank on the jaw having a guide for a movable jaw, a screw opening therein and bearing pin openings in the shank extending in alinement from opposite sides of the screw opening; a movable jaw operating on said guide; a screw arranged in the opening operating on the movable jaw, said screw having a tapered bearing surface; a pin fixed in one opening receiving the thrust of the screw; an axially yielding pin provided with a tapered surface in the opposite opening engaging the screw with its tapered surface and yieldingly holding the screw in place; and a spring in the opening back of said yielding pin, both of said pins having an extension of small diameter preventing the accidental removal of the screw.

7. In a wrench, the combination of a fixed jaw; a shank extending therefrom having a guide for a movable jaw, a screw opening and a bearing pin opening extending from the walls of the screw opening; a movable jaw on the guide having a rack extending into the screw opening; a screw operating on the rack, said screw having a central opening with tapered ends; a bearing pin having its tapered surface receiving the thrust of the screw, said bearing pin being arranged in one of the screw bearing openings and having a shoulder engaging the wall of the screw opening; a movable pin arranged in the opposite opening, said pin having tapered bearing surfaces centering the screw; and a spring in the opening back of the movable pin.

8. In a wrench, the combination of a jaw actuating rack; a screw operating on the rack; and a bearing for the screw comprising an axially yielding pin having a tapered surface engaging the screw, the yielding of the pin through pressure on said surface permitting a movement of the screw out of engagement with the rack.

9. In a wrench, the combination of a jaw actuating rack; a screw operating on the rack; and end bearings for the screw, one of said bearings being in the form of a tapered pin adapted to receive the thrust of the screw and tending to center the screw, the other of said bearings being in the form of an axially yielding pin having a tapered surface engaging the screw and tending to center the screw, the yielding of said yielding pin permitting a movement of the screw out of engagement with the rack.

In testimony whereof I have hereunto set my hand.

EDWIN J. ARMSTRONG.